No. 688,977. Patented Dec. 17, 1901.
J. F. SKIRROW.
COUNTER.
(Application filed Mar. 11, 1901.)
(No Model.) 2 Sheets—Sheet 1.
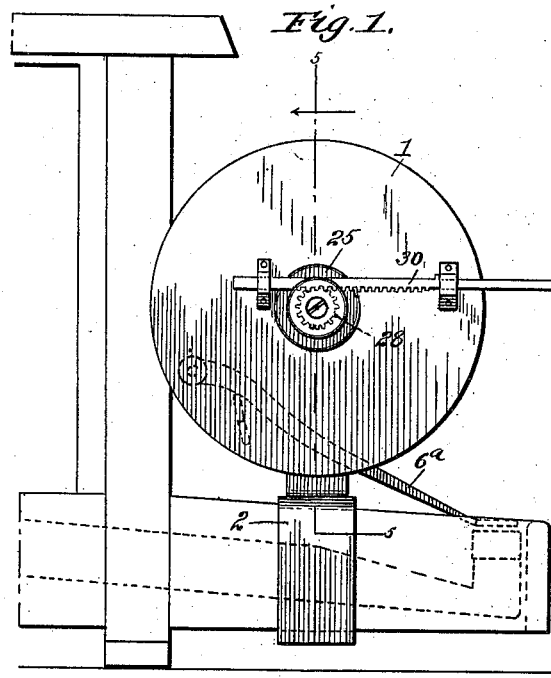
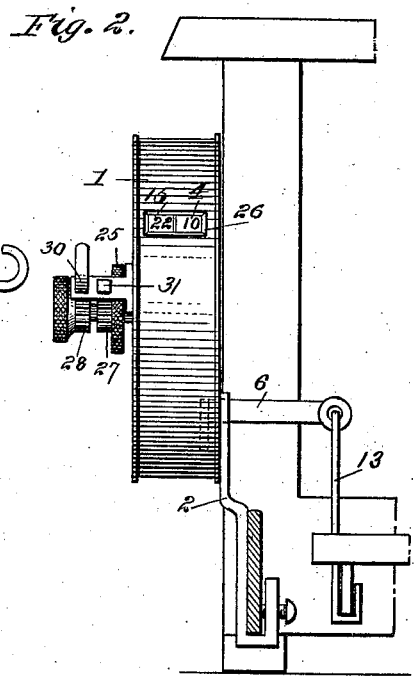
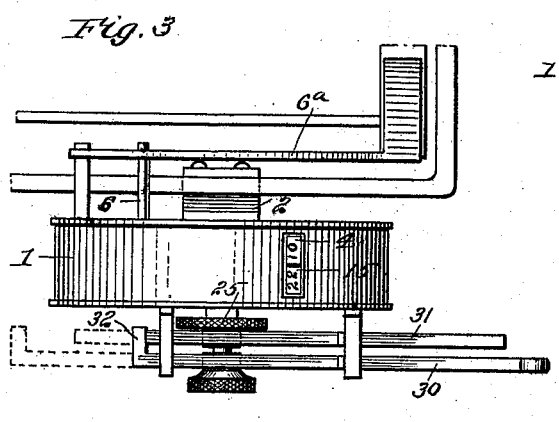
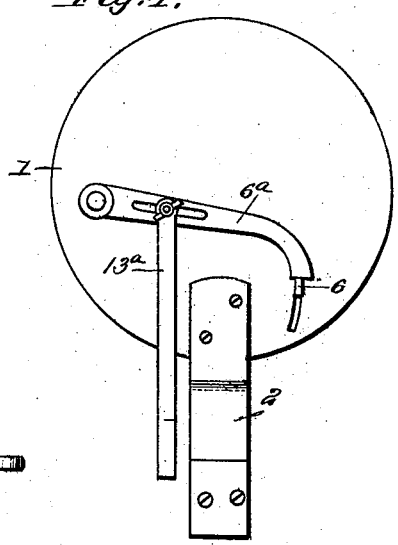
WITNESSES:
C. J. Babcock
R. H. Bishop
INVENTOR,
John F. Skirrow,
BY Davis & Davis,
ATTORNEYS.

No. 688,977. Patented Dec. 17, 1901.
J. F. SKIRROW.
COUNTER.
(Application filed Mar. 11, 1901.)
(No Model.) 2 Sheets—Sheet 2.
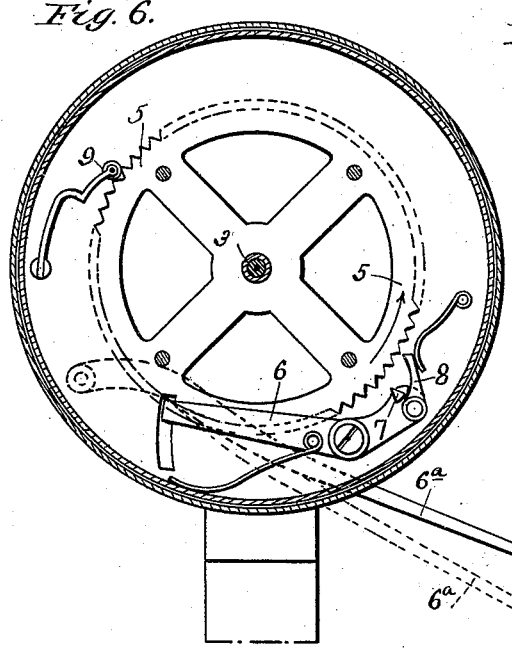
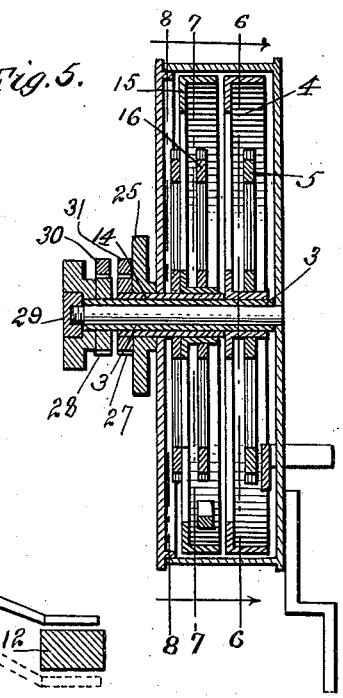
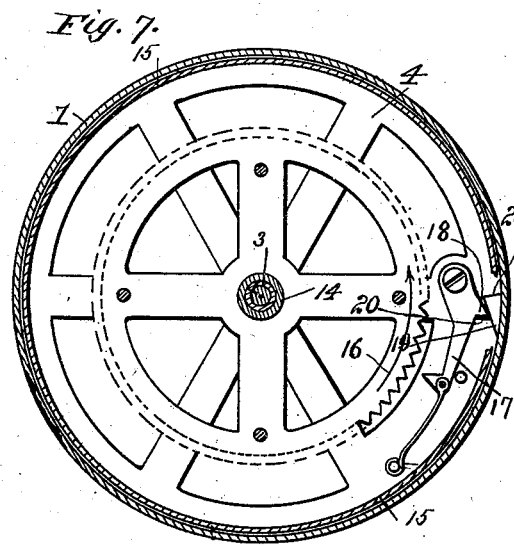
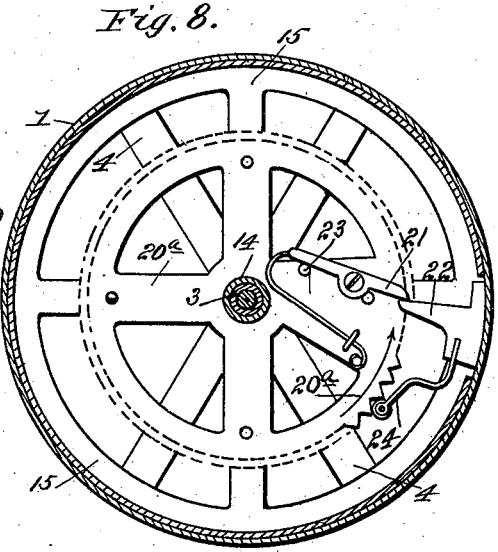
WITNESSES:
C. J. Babcock
R. H. Bishop
INVENTOR,
John F. Skirrow,
BY Davis & Davis
ATTORNEYS.

UNITED STATES PATENT OFFICE.

JOHN F. SKIRROW, OF EAST ORANGE, NEW JERSEY, ASSIGNOR OF ONE-HALF TO CHARLES SHIRLEY, OF BROOKLYN, NEW YORK.

COUNTER.

SPECIFICATION forming part of Letters Patent No. 688,977, dated December 17, 1901.

Application filed March 11, 1901. Serial No. 50,572. (No model.)

*To all whom it may concern:*

Be it known that I, JOHN F. SKIRROW, a citizen of the United States, and a resident of East Orange, in the county of Essex, State of New Jersey, have invented certain new and useful Improvements in Counting-Machines, of which the following is a specification, reference being had therein to the accompanying drawings, in which—

Figure 1 is a side elevation of a portion of the frame of a type-writer with the device in position; Fig. 2, a front elevation, the type-writer frame being in section, a slightly-modified form of mechanism being shown for operating the actuating-lever from the striking-bar of the type-writer; Fig. 3, a plan view of the mechanism shown in Fig. 1; Fig. 4, a detailed view of another modified form of device for operating the actuating-lever; Fig. 5, a vertical transverse section on line 5 5 of Fig. 1; Fig. 6, a vertical section on the line 6 6 of Fig. 5; Fig. 7, a similar view on line 7 7 of Fig. 5, and a Fig. 8 a similar view on line 8 8 of Fig. 5.

The object of this invention is to produce a simple word-counter adapted to be attached to a type-writer and to be operated simultaneously with the depression of the space-bar thereof. Another object of the invention is to provide means whereby the indicator-wheels may be instantly and simultaneously returned to zero, and, further, to provide means whereby the said wheels may be readily rotated and adjusted or set to show the desired number.

The device may, as will be manifest, be mounted on an independent base and be provided with an independent operating-key, if desired.

Referring to the various parts by numerals, 1 designates a short cylindrical casing which is open at its outer side and is mounted on a standard 2, which standard is secured to the closed side of the case and is adapted to be secured to the side arm of a type-writer frame at the left of the keyboard. Rigidly secured in the center of the permanent side of this casing is a horizontal pin or spindle which projects axially through the casing. On this pin is a closely-fitting rotatable sleeve 3, whose inner end bears against the closed side of the casings, its outer end extending out beyond the open side thereof. On this sleeve near its inner end is secured a "units" indicator-wheel 4, which is nearly equal in diameter to the interior of the casing and is formed with an annular flange at its periphery on which the numbers are placed. Secured to this indicator-wheel or to the sleeve 3 adjacent the wheel, so as to be fixed in its relation to the said wheel, is a notched disk or ratchet-wheel 5, which is provided with a notch for each number placed on the number-wheel, said notches being equal distances apart. Pivoted within and to the permanent side of the casing is an actuating-lever 6, whose rear end is bent and extends through a slot in the permanent side of the casing and is in position to be connected to or engaged by suitable operating devices. The forward end of this lever is provided with a Λ-shaped stop-lug 7, which is arranged to enter the notches in the disk attached to the sleeve 3 and to thereby prevent the rotation of the units-wheel. On the forward end of this actuating-lever is pivoted a spring driving-pawl 8, which is normally out of engagement with the notched disk 5, but which engages a notch in said disk when the rear end of the actuating-lever is depressed and moves said disk one notch before the stop-lug 7 engages said disk. A suitable spring is connected to the rear end of the actuating-lever to normally maintain said rear end in its raised position. A spring riding pawl 9 rides in the notches of the disk 5 and acts as a brake to prevent a too free rotation of the indicator-wheel.

The outer end of the actuating-lever 6 is engaged by a forward-extending actuating-arm 6ª, which is pivoted on the casing, its forward end being bent laterally and lying in the path of the space-bar 12 of the type-writer. This laterally-bent end lies above the space-bar, so that the space-bar may be actuated independently of the actuating-arm or simultaneously therewith, or it may be placed under the space-bar, as shown in dotted lines in Fig. 6. In this latter case the space-bar can be operated independently by depressing the end farthest from the actuating-arm 6ª.

If desired, the outer end of the actuating-lever may be connected to one of the pivoted arms which carry the space-bar by a depending link 13, as in the slightly-modified form shown in Fig. 2.

On the sleeve 3 is mounted a closely-fitting rotatable sleeve 14, whose inner end bears against the units indicator-wheel 4, its outer end extending beyond the open side of the casing. On this sleeve is rigidly secured the "hundreds" indicator-wheel 15, which is similar in size to the units-wheel, and secured to said wheel or to the sleeve, so as to be fixed in its relation to the wheel 14, is a notched disk 16, similar to disk 5 of the units-wheel. Pivoted on the units-wheel adjacent the notched disk of the hundreds-wheel is a pawl 17, which is provided with a spring to normally hold its engaging end out of engagement with the notched disk 16, said pawl extending in the opposite direction to the rotation of the indicator-wheels. On the outer edge of this pawl is formed a cam 18, which inclines toward the pivot of the pawl and is adapted to engage a similar stationary cam 19, formed on the inner side of the cylindrical casing, to cause the pawl to engage the notched disk 16 and move said disk one notch while the two cams are in engagement. These cams are formed with the radial edges 20 to permit the pawl to quickly leave the notched disk 16, said radial edges forming stops to permit the wheel 4 to be quickly returned to and stopped at zero. The cam 19 is so placed that when the units-wheel indicates "99" the next movement will cause the pawl 17 to engage disk 16 and move the hundreds-wheel from zero to "1," said pawl being then quickly released from said notched disk.

On the outer side of the wheel 15—that is, on the side opposite the notched disk 16—is a similar notched disk 20ª, whose notches are coincident with those in disk 16, and pivoted on this notched disk is a stop-pawl 21, whose outer end engages a stop 22, which is secured to the casing, as the said disk rotates. The inner end of this pawl engages a pin 23, which prevents the said pawl turning on its pivot when the rotation of the wheel 15 is reversed to bring said wheel to zero.

It will be noted that the stop-pawls on both indicator-wheels permit the said wheels to rotate in the proper direction to count; but when the direction of rotation is reversed these stop-pawls stop both wheels at zero. A riding detent 24 engages the notched disk 20 and prevents a too-free rotation of the hundreds-wheel. A removable cover is provided for the open side of the casing.

On the outer end of the sleeve 14 and bearing against the removable cover is an operating-knob 25, which may be grasped in the left hand and the indicator-wheel 15 rotated to return it to zero or to bring any desired number thereon opposite the opening 26 in the face of the casing 1. To the sleeve 14 on the outer side of the knob 25 is secured a small gear 27. On the sleeve 3, adjacent the gear 27, is a similar small gear 28, and on the end of the sleeve 3 is an operating-knob similar to and for the same purposes as the knob 25. On the end of the pin 2 is screwed a retaining-plug 29. Engaging the gear 28 is a rack-bar 30, whose forward end is formed into a finger-hook. This bar slides in suitable boxes secured to the adjacent side of the casing. As the wheel 4 is rotated through the counting mechanism this bar is carried rearward until the count exceeds ninety-nine, when the rack is in the rear of the gear. By drawing the rack-bar forward to its original position the wheel 4 will be returned to zero. Engaging the gear 27 is a rack-bar 31, which is carried rearward as the wheel 15 is rotated by the counting mechanism. The rear end of this bar 31 terminates in front of the hook 32, formed on the rear end of the bar 30, so that when said bar 30 is drawn forward to its normal position this hook will engage the rear end of bar 31 and return it to its normal position, thereby returning both indicator-wheels to zero.

In the modification shown in Fig. 4 means is shown for adjusting the operating mechanism to the throw of the levers of the space-bar. In this form of mechanism the forward end of an actuating-arm 6ᵇ bears on the projecting end of the actuating-lever. A longitudinal slot is formed in this arm 6ᵇ, and adjustably secured in this slot is the upper end of a link 13ª, the lower end of this link being adapted to be secured to one of the levers which support the striking-bar of the typewriter. By this means the link 13ª may be adjusted in the slot, and the stroke of the arm 16 thus regulated with respect to the movement of the striking-bar levers to secure the proper operation of the counting mechanism. It will thus be seen that the indicator-wheels will be positively actuated by the same motion of the operator's hand which depresses the space-bar of the typewriter. It will also be noted that both indicator-wheels are free to be quickly rotated in either direction to bring them to zero or to cause any desired number on them to show through the opening 26. It is obvious that an independent operating-key may be connected to the actuating-lever 6 and that any desired number of indicating-wheels may be employed.

When the device is constructed as shown in the drawings, the indicator-wheels are designed to carry numbers from "0" to "99."

Having thus fully described my invention, what I claim, and desire to secure by Letters Patent, is—

1. In combination, the casing, means for supporting the casing, an indicator-wheel rotatably mounted therein, a notch-disk rotatable with the indicator-wheel, an actuating-lever pivoted in the casing and carrying a stop-lug and a driving-pawl on one of its ends, which are adapted to engage the notch-disk, the other end of said lever extending without the casing and adapted to be engaged by an actuating-arm, a spring-controlled pawl carried by said indicator-wheel and formed with a cam on its outer edge, a cam on the casing adapted to be engaged by the cam on the pawl, a second notch-disk adapted to be engaged by the pawl carried by the first indicator-wheel when said pawl engages the cam on the casing, a pawl on the second notch-disk, a second indicator-wheel secured to the second notch-disk, a cam on the casing adapted to be engaged by the pawl on the second notch-disk, the cams on the casing being adapted to stop said wheels at zero when they are rotated in one direction, said pawls moving on their pivots to pass said stops when said wheels are rotated in the other direction, means for rotating the indicator-wheels in either direction, said means being independent of the actuating-lever.

2. The combination of a casing, an indicator-wheel rotatably mounted therein and provided with numbers on its periphery, a disk rotatable with the wheel and provided with notches in its periphery said notches corresponding with the numbers on the wheel, an actuating-lever within the casing and carrying a stop-lug and a driving-pawl on one end its other end extending without the casing, and an actuating-arm engaging the outer end of the actuating-lever and extending forward, its forward end being bent laterally and lying in the vertical plane of the striking-bar and in close proximity thereto but unconnected thereto.

3. The combination of a casing, an indicator-wheel therein, an actuating-lever for said wheel, a striking-bar, and an actuating-arm adapted to operate the actuating-lever and extending forward, its forward end being bent laterally and lying in the vertical plane of the striking-bar and in close proximity thereto but unconnected therewith, substantially as described.

4. In combination with a type-writer, a casing, an indicator-wheel therein, an actuating-lever for moving said wheel, said lever being pivoted within the casing its free end extending outside said casing, a transverse striking-bar at the front of the type-writer, and an arm pivoted to the casing at its rear end and adapted to contact with the projecting end of the actuating-lever, the forward end of said arm being freely movable and being unconnected with the striking-bar but lying in the vertical plane of said bar.

5. The combination of a casing, an indicator-wheel rotatably mounted therein and carrying an annular series of notches, an actuating-lever pivoted in the casing and carrying a stop-lug and a driving-pawl on one of its ends which are adapted to be brought into engagement with the notches the other end of the lever extending without the casing, an actuating-arm outside of the casing and engaging the actuating-lever, the forward end of said arm lying in the vertical plane of the striking-bar of a type-writer and in close proximity thereto, a spring-controlled pawl carried by the indicator-wheel and formed with a cam on its outer edge, a cam on the casing adapted to be engaged by the cam on the pawl, a second indicator-wheel carrying a series of notches adapted to be engaged by the pawl on the first indicator-wheel when said pawl engages the cam on the casing, a pawl carried around with the second indicator-wheel, a cam on the casing adapted to be engaged by the pawl carried by the second indicator-wheel, the cams on the casing being adapted to stop the wheels at zero when said wheels are rotated in one direction, and means for rotating said wheels in either direction said means being independent of the actuating-lever.

6. The combination of a casing, an indicator-wheel rotatably mounted therein and carrying an annular series of notches, an actuating-lever pivoted in the casing and carrying a stop-lug and a driving-pawl on one of its ends which are adapted to be brought into engagement with the notches the other end of the lever extending without the casing, a spring-controlled pawl carried by the indicator-wheel and formed with a cam on its outer edge, a cam on the casing adapted to be engaged by the cam on the pawl, a second indicator-wheel carrying a series of notches adapted to be engaged by the pawl on the first indicator-wheel when said pawl engages the cam on the casing, a pawl carried around with the second indicator-wheel, a cam on the casing adapted to be engaged by the pawl carried by the second indicator-wheel, the cams on the casing being adapted to stop the wheels at zero when said wheels are rotated in one direction, and means for rotating said wheels in either direction said means being independent of the actuating-lever.

7. In combination, a casing, a rotatable indicator-wheel mounted therein on a shaft, means for rotating said wheel step by step in one direction, said wheel being normally free to rotate in the other direction, means to stop said wheel at zero when it is rotated in a direction reverse to the step-by-step motion, a second indicator-wheel, a sleeve surrounding the shaft of the first indicator-wheel and carrying the second indicator-wheel, means carried by the first wheel to rotate the second wheel step by step in one direction, means to stop said second wheel at zero when it is rotated in the other direction, a reciprocable rod, and means actuated by said rod and connected to the shafts of the wheels whereby said wheels may be returned to zero by a movement of said rod.

8. In combination, a casing, a rotatable indicator-wheel mounted therein on a shaft, means for rotating said wheel step by step in one direction, said wheel being normally free to rotate in the other direction, means to stop said wheel at zero when it is rotated in a direction reverse to the step-by-step motion, a second indicator-wheel, a sleeve surrounding the shaft of the first indicator-wheel and carrying the second indicator-wheel, means carried by the first wheel to rotate the second wheel step by step in one direction, means to stop said second wheel at zero when it is rotated in the other direction, a gear on the outer end of the shaft of each indicator-wheel, a rack engaging each of said gears, and means carried by one of said racks and adapted to engage the other rack when it is moved in one direction, whereby both of the indicator-wheels may be returned to zero by the movement of one rack.

In testimony whereof I hereunto affix my signature, in the presence of two witnesses, this 9th day of March, 1901.

JOHN F. SKIRROW.

Witnesses:
 JOHN G. PEARSE,
 WM. R. DAVIS.